United States Patent [19]

Sewell, Sr.

[11] 4,149,862

[45] Apr. 17, 1979

[54] HIGH TEMPERATURE GAS FILTERING DEVICE

[76] Inventor: Robert R. Sewell, Sr., Rte. 2, Box 134-A, Gooding, Id. 83330

[21] Appl. No.: 918,091

[22] Filed: Jun. 22, 1978

[51] Int. Cl.² ............................................. B01D 50/00
[52] U.S. Cl. ........................................ 55/316; 55/487; 55/498; 55/387; 55/500; 55/DIG. 30; 60/311; 181/258; 422/181
[58] Field of Search ................. 55/276, 486, 487, 316, 55/498, 500, 387, DIG. 30, DIG. 21; 60/311; 181/227, 228, 244, 245, 256, 258; 422/181

[56] References Cited

U.S. PATENT DOCUMENTS

| | | | |
|---|---|---|---|
| 3,018,841 | 1/1962 | Gerlich | 60/311 |
| 3,147,097 | 9/1964 | Aguas | 55/276 |
| 3,857,688 | 12/1974 | Wisnewski | 55/498 |
| 3,898,064 | 8/1975 | Tao et al. | 55/276 |

FOREIGN PATENT DOCUMENTS 435423  9/1935  United Kingdom .............. 55/DIG. 21

*Primary Examiner*—Bernard Nozick
*Attorney, Agent, or Firm*—Shanley, O'Neil and Baker

[57] ABSTRACT

An internal combustion engine exhaust gas filtering device in which an elongated high temperature resistant filter cartridge, gas permeable from end to end and radially, is received within a sheet metal casing having gas inlet and gas outlet ends with the filter cartridge spaced from the gas inlet end to form an entering exhaust gas distributing plenum, the filter cartridge being spaced from the casing internal side walls by an elongated circumferential spacing member which forms gas passages along the length of the filter cartridge which are open toward the filter cartridge but are closed toward the casing internal side walls whereby the exhaust gas to be filtered can flow longitudinally into the filter cartridge from the entering gas plenum and can flow radially from the passages in the spacing member into the filter cartridge, the spacing member also acting to protect the sheet metal casing against high temperature corrosive action of the exhaust gases.

8 Claims, 4 Drawing Figures

HIGH TEMPERATURE GAS FILTERING DEVICE

BACKGROUND OF THE INVENTION

Numerous attempts have been made to produce satisfactory filtering devices for removing objectionable constituents from the exhaust gases of internal combustion engines. The filters of the prior art have been subject to two common mechanical faults, namely, channeling of the gases in the filter element whereby intimate contact between the gases to be filtered and the filtering substance is not achieved and a deterioration of the structure of the gas filtering device due to the corrosive effects of the exhaust gases at the high temperatures involved. The present invention achieves a remedy of both of these prior art difficulties by a novel form of construction of the interior of the filtering device in combination with a novel filter cartridge. In the present invention a spacing member which spaces the filter cartridge from the exterior casing of the device is designed to protect the exterior casing and at the same time to distribute the gases to be filtered in the most efficient manner through a specially designed filter cartridge which is gas permeable from end to end and radially.

SUMMARY OF THE INVENTION

An internal combustion engine exhaust gas filtering device comprising an elongated cylindrical casing formed of sheet metal, the casing having end closures and longitudinal internal surfaces, exhaust gas inlet means associated with one end closure and treated gas outlet means associated with the other end closure, a replaceable elongated filter means for reception within the casing, the filter means having porous external end surfaces and porous longitudinal external surfaces and being formed of a plurality of concentric layers of porous pulverulent material held between porous layers of fibrous filter material, whereby the filter means is gas permeable from end to end and radially from the longitudinal external surfaces thereof inwardly, a spacing means formed of rigid sheet material, refractory relative to the temperature and corrosive characteristics of the exhaust gases, disposed in contiguous relation to the longitudinal internal surfaces of the casing for holding the filter means within the casing with the porous longitudinal external surfaces of the filter means in contact with the spacing means but spaced from the longitudinal internal surfaces of the casing, and means spacing one end of the filter means from the gas inlet means of the casing to form an entering gas distributing plenum, the spacing means including wall surfaces extending longitudinally of the casing and in spaced relation to the internal surfaces of the casing, the spacing means wall surfaces forming a plurality of passages for longitudinal flow of the gases, the passages being in communication with the gas distributing plenum and open to the porous longitudinal external surfaces of the filter means in the direction of the length dimension thereof but closed toward the internal surfaces of the casing, whereby the exhaust gas to be filtered can enter the filter means longitudinally from the gas distributing plenum and can enter the filter cartridge radially from the passages.

BRIEF DESCRIPTION OF THE DRAWINGS

FIGS. 4 and 5 are schematic views of the filter of the present invention in the environment of use.

DETAILED DESCRIPTION OF A PREFERRED EMBODIMENT OF THE PRESENT INVENTION

Figure 1:
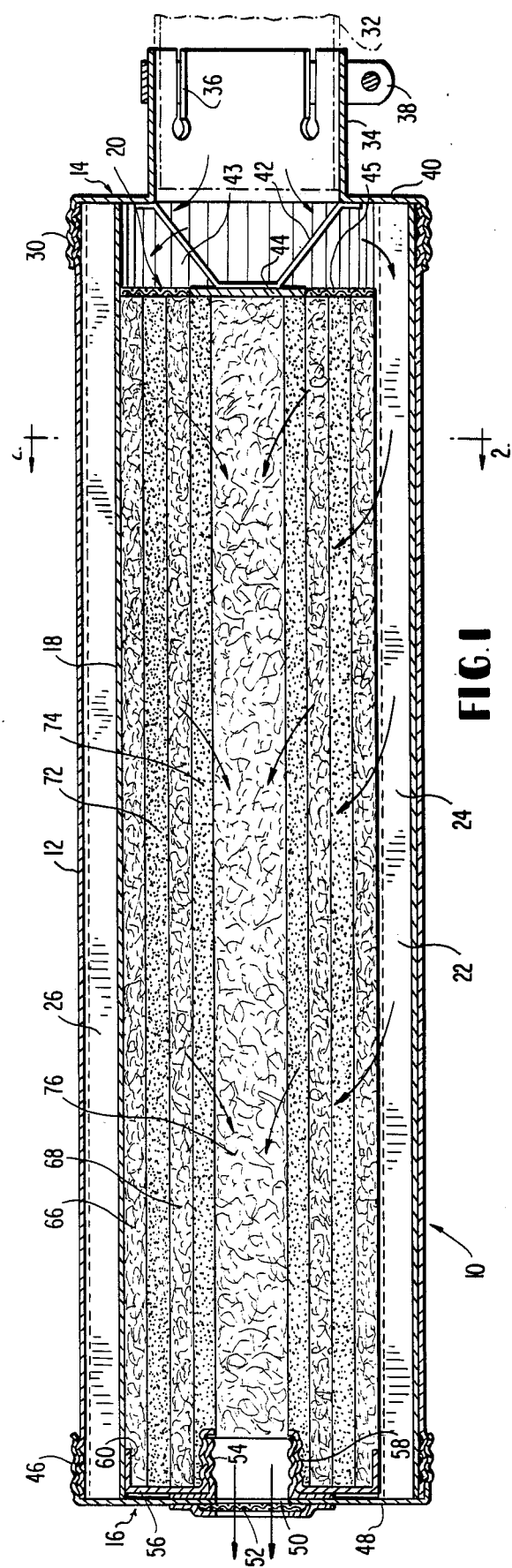
FIG. 1 is a view in longitudinal section taken on the line 1—1 of FIG. 2 of a preferred embodiment of the present invention.
Figure 2:
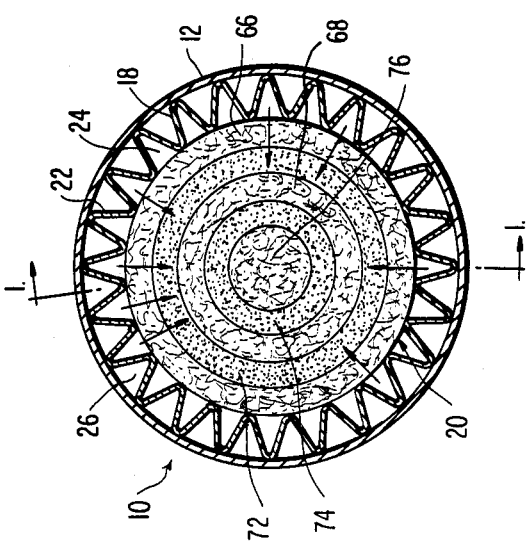
FIG. 2 is a view in cross section taken on the line 2—2 of FIG. 1.

Referring to FIGS. 1 and 2 a filter casing is indicated generally by the reference numeral 10 made up of a cylindrical body portion 12, a gas entrance end structure 14 and a gas exit end structure 16. Since internal combustion engine exhaust gas filters often operate at temperatures as high as 500° F. and higher and include constituents which are extremely corrosive at elevated temperatures, it is not uncommon to form filter casings entirely from stainless steel, a very expensive material. The present invention makes possible the use of a plain carbon steel in the body portion 12 and end structure 16, the latter being protected by part of the cartridge as will be described hereinafter. Where a longer life is desired for these parts in the present invention, they may be formed of aluminum coated or lead coated steel of a type currently often used in mufflers. Within casing 10, which is the preferred embodiment is cylindrical, a spacing member 18 coextensive with shell 12 and having the cross-sectional shape shown in FIG. 2, fits snugly within shell 12 and in turn snugly receives a filter cartridge indicated generally by the reference numeral 20. Spacing member 18 can be formed from a corrugated sheet of stainless steel or aluminum or lead coated steel, the former having the longest life under the relatively high temperature and corrosive conditions present in the filter. The term "corrugated" is used for convenience, the term being intended to embrace all shapes wherein walls such as those indicated at 22 form passages 24 between the spacing member 18 and the external surfaces of the filter cartridge 20, such passages 24 being open along their length dimension to the gas permeable external surfaces of the filter cartridge 20. Walls 22 also form passages 26 between the spacing member 18 and the internal surfaces of shell 12.

In the preferred embodiment of the present invention as illustrated in the drawings, end structure 14 can be formed of stainless steel or aluminum coated or lead coated carbon steel. This structure can be in the form of a cap having screw threaded flanges 30 mating with screw threads formed in the end of shell 12. The structure includes means for connecting the filter device to the tailpipe 32, shown in phantom, of an internal combustion engine by means of a conventional, reduced diameter neck 34 and the usual circumferential slots 36 and coacting tightening band 38. End structure 14 includes annular closure diaphragm 40 which closes to atmosphere the gas entry end of the filter device and closes the ends of passages 26. An opening in this diaphragm coincides with reduced neck 34 to allow entry of the engine exhaust gases to be treated. A spacing element 42 carried by the end structure 14 acts as a stop for filter cartridge 20 in spaced relation to end structure 14, thereby forming a gas distributing plenum 43 which as shown by the arrows in FIG. 1 distributes the entry gases over the end of the filter cartridge and into the entry ends of passages 24 which it will be observed open into plenum 43. A disc 44 carried by the filter cartridge acts to prevent the gases from flowing straight through the core of the filter.

The discharge end structure 16 can also be in the form of a cap with threaded flanges 46 coacting with threads in the end of shell 12. An annular diaphragm 48 closes this end of the casing to atmosphere with an opening 50 for discharge of gases which have been treated. The opening 50 includes a screen 52 for preventing the loss of pulverulent material from the filter cartridge. A threaded neck 54 extends inwardly from end structure 16 and has a flange which is welded to diaphragm 48. The discharge end of filter cartridge 20 is closed by a diaphragm 56 carrying an inwardly projecting neck 58 in which are formed female screw threads which mate with those on neck 54. Diaphragm 56 has an inwardly projecting flange 60 which is adhered in any suitable manner to the external end surface of filter cartridge 20. Thus it will be seen that when the efficiency of the filtering action of the cartridge is reduced due to clogging and/or poisoning of the carbon, by unscrewing the end structure 16, the used filter can be withdrawn and a fresh filter cartridge screwed onto threaded neck 54 for insertion into casing 10.

In FIG. 2 it will be seen that spacing member 18 contacts shell 12 along all or some of the lines presented by the outermost surfaces of the corrugations of spacing member 18. It will also be apparent from this figure that the passages 26 between the corrugations of spacing member 18 and the internal surfaces of shell 12 are closed at both ends by virtue of the fact that spacing member 18 extends from end structure 14 to end structure 16. Although there may be line contact between the outermost surfaces of the corrugations and the internal surfaces of shell 12, the internal surfaces of walls 22 which do not touch shell 12 form passages 24 spaced from the internal surfaces of shell 12 and are insulated from shell 12 by the "dead air" space in passages 26. As a result of this construction, hot corrosive gases flowing longitudinally of the filtering device through passages 24 have a small degree of thermal conductivity contact with shell 12 and of course no gas to metal contact with shell 12.

The novel form of filter cartridge designed to coact with the cartridge holding casing 10 of the present invention is one in which porous layers of absorbent and adsorbent filtering material are alternated in such a way that the filter is gas permeable longitudinally from plenum chamber 43 and radially from passages 24. The preferred filter is made up of fiberglass sheets or batts 66 and 68, is concentric layers alternating with layers of a porous carbonaceous material 72, 74. A suitable form of porous fiberglass material for layers 66 and 68 will be made up of convolutions of "fiberglass paper" of the type described in U.S. Pat. No. 3,857,688. The porous carbonaceous material for the present filter cartridge can be the charcoal or carbon particles of the type described in U.S. Pat. Nos. 3,738,854, 3,593,499 and 3,675,398. The porous material forming core 76 of the cartridge can be fiberglass batts somewhat more dense that the fiberglass material of layers 66 and 68 so as to perform some filtering action while preventing channeling of the gases through the core of the cartridge.

The gas entry end of filter cartridge 20 between disc 44 and the external surface of the filter is closed by a porous annular sheet of fiberglass paper which permits free flow of the gases into the end of the filter cartridge but restrains the pulverulent adsorbent material from escaping. If desired, a layer of perforated foil (not shown) can form the outer cylindrical surface of the cartridge, where a skin of this nature might be advisable to protect during shipping and handling of the cartridge prior to insertion in the device.

Figure 3:
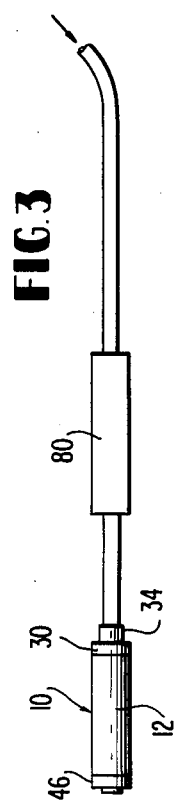
FIG. 3 is a fragmentary view in side elevation of a modification of a component of the present invention.

FIG. 3 shows the filtering device of the present invention positioned downstream of a conventional internal combustion engine muffler 80.

Figure 4:
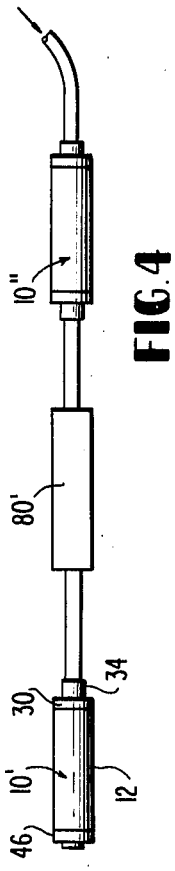

FIG. 4 discloses a system incorporating two of the filters of the present invention, one filter device 10' downstream of a conventional muffler 80' and one filter device 10'' upstream of the conventional muffler.

The preferred embodiment disclosed herein is to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

I claim as my invention:

1. An internal combustion engine exhaust gas filtering device comprising
   an elongated cylindrical casing formed of sheet metal, the casing having end closures and longitudinal internal surfaces,
   exhaust gas inlet means associated with one end closure and treated gas outlet means associated with the other end closure,
   a replaceable elongated filter means for reception within the casing, the filter means having porous external end surfaces and porous longitudinal external surfaces and being formed of a plurality of concentric layers of porous pulverulent material held between porous layers of fibrous filter material, whereby the filter means is gas permeable from end to end and radially from the longitudinal external surfaces thereof inwardly,
   a spacing means formed of rigid sheet material, refractory relative to the temperature and corrosive characteristics of the exhaust gases, disposed in contiguous relation to the longitudinal internal surfaces of the casing for holding the filter means within the casing with the porous longitudinal external surfaces of the filter means in contact with the spacing means but spaced from the longigudinal internal surfaces of the casing, and
   means spacing one end of the filter means from the gas inlet means of the casing to form an entering gas distributing plenum,
   the spacing means including wall surfaces extending longitudinally of the casing and in spaced relation to the internal surfaces of the casing, the spacing means wall surfaces forming a plurality of passages for longitudinal flow of the gases, the passages being in communication with the gas distributing plenum and open to the porous longitudinal external surfaces of the filter means in the direction of the length dimension thereof but closed toward the internal surfaces of the casing, whereby the exhaust gas to be filtered can enter the filter means longitudinally from the gas distributing plenum and can enter the filter cartridge radially from the passages.

2. The apparatus of claim 1 wherein
   means are associated with the spacing means for forming second passages defined in part by the longitudinal internal surfaces of the casing, and means are provided for preventing flow of exhaust gas through the second passages.

3. The apparatus of claim 2 wherein the spacing means comprises a longitudinally corrugated sheet, and the first claimed passages are formed by the corrugations and the external surfaces of the filter cartridge, and the second passages are formed by the corrugations and the internal surfaces of the casing.

4. The apparatus of claim 3 wherein the corrugations make line contact with the longitudinal internal surfaces of the casing.

5. The apparatus of claim 1 wherein the spacing means comprises a longitudinally corrugated sheet, and the first claimed passages are formed by the corrugations and external surfaces of the filter cartridge, and the second passages are formed by the corrugations and the internal surfaces of the casing.

6. The apparatus of claim 5 wherein the corrugations make line contact with the longitudinal internal surfaces of the casing.

7. The apparatus of claim 6 wherein means are provided for preventing flow of exhaust gas through the second passages.

8. The apparatus of any one of the preceding claims wherein the pulverulent material is a granular form of carbon and the fibrous material comprises fiberglass in batt or sheet form.

* * * * *

UNITED STATES PATENT AND TRADEMARK OFFICE
CERTIFICATE OF CORRECTION

PATENT NO. : 4,149,862
DATED : April 17, 1979
INVENTOR(S) : Robert R. Sewell, Sr.

It is certified that error appears in the above-identified patent and that said Letters Patent are hereby corrected as shown below:

Column 2, line 2, after "FIG. 1" change the semicolon (;) to a comma (,) and add -- and --;

cancel lines 3, 4 and 5;

line 6, change "FIGS. 4 and 5" to -- FIGS. 3 and 4 --.

Signed and Sealed this

Eleventh Day of September 1979

[SEAL]

Attest:

LUTRELLE F. PARKER
Attesting Officer  Acting Commissioner of Patents and Trademarks